United States Patent
Shin et al.

(10) Patent No.: US 12,175,587 B2
(45) Date of Patent: Dec. 24, 2024

(54) APPARATUS AND METHOD WITH GRAPHICS PROCESSING

(71) Applicant: Samsung Electronics Co., Ltd., Suwon-si (KR)

(72) Inventors: Youngsam Shin, Hwaseong-si (KR); Yeongon Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 17/572,755

(22) Filed: Jan. 11, 2022

(65) Prior Publication Data
US 2022/0309734 A1    Sep. 29, 2022

(30) Foreign Application Priority Data

Mar. 29, 2021 (KR) .................. 10-2021-0040598
Jul. 8, 2021 (KR) .................. 10-2021-0089737

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 7,782,318 B2 * | 8/2010 | Shearer | G06T 15/06 378/98.12 |
| 8,300,049 B2 | 10/2012 | Peterson et al. | |
| 10,262,456 B2 * | 4/2019 | Afra | G06T 15/80 |
| 10,483,978 B1 * | 11/2019 | Finkbeiner | G06F 3/0688 |
| 10,846,909 B2 | 11/2020 | Yoon | |
| 2006/0059494 A1 * | 3/2006 | Wexler | G06F 9/505 718/105 |

(Continued)

FOREIGN PATENT DOCUMENTS

JP          6422618 B2      11/2018
KR   10-2015-0039493 A      4/2015

(Continued)

OTHER PUBLICATIONS

Hughes, Christopher J., et al. "Memory-side prefetching for linked data structures for processor-in-memory systems." Journal of Parallel and Distributed Computing 65.4 (Feb. 1, 2005): 448-463.

(Continued)

*Primary Examiner* — Andrew G Yang
(74) *Attorney, Agent, or Firm* — NSIP Law (57) ABSTRACT

An apparatus with graphics processing includes: a memory configured to store therein acceleration structure data and primitive data for performing three-dimensional (3D) rendering; and a first processor implemented in the memory and configured to receive ray information, determine a first spatial box by performing a traversal on an acceleration structure in which scene objects are spatially partitioned based on the acceleration structure data and the ray information, and determine a first intersection point for performing the 3D rendering based on the primitive data, the ray information, and the first spatial box.

23 Claims, 8 Drawing Sheets

(56) References Cited

U.S. PATENT DOCUMENTS

| | | | |
|---|---|---|---|
| 2012/0137108 A1* | 5/2012 | Koch, III | G06F 9/3004 |
| | | | 712/200 |
| 2012/0243777 A1* | 9/2012 | Christopher | G06V 10/764 |
| | | | 382/154 |
| 2013/0050213 A1 | 2/2013 | McCombe et al. | |
| 2014/0078143 A1* | 3/2014 | Lee | G06T 15/06 |
| | | | 345/426 |
| 2014/0347355 A1* | 11/2014 | Yoon | G06T 15/06 |
| | | | 345/419 |
| 2017/0061674 A1* | 3/2017 | Lee | G06T 15/005 |
| 2019/0197663 A1 | 6/2019 | Jin | |
| 2019/0266782 A1* | 8/2019 | Howson | G06T 1/20 |
| 2020/0167098 A1 | 5/2020 | Shah et al. | |
| 2020/0372343 A1* | 11/2020 | Mikami | G06N 3/084 |
| 2021/0383591 A1* | 12/2021 | Gupta | G06T 15/08 |
| 2022/0058854 A1* | 2/2022 | Cerny | G06T 15/005 |
| 2022/0066662 A1* | 3/2022 | Islam | G06F 3/0673 |

FOREIGN PATENT DOCUMENTS

| | | |
|---|---|---|
| KR | 10-1697238 B1 | 1/2017 |
| KR | 10-1807172 B1 | 12/2017 |
| KR | 10-2080851 B1 | 2/2020 |
| KR | 10-2169799 B1 | 10/2020 |

OTHER PUBLICATIONS

Mark, William R., et al. "Real-time rendering systems in 2010." ACM SIGGRAPH 2005 Courses. May 2, 2005, (8 pages in English).

Kotra, Jagadish B., et al. "Quantifying the potential benefits of on-chip near-data computing in Manycore processors." 2017 IEEE 25th International Symposium on Modeling, Analysis, and Simulation of Computer and Telecommunication Systems (MASCOTS). IEEE, 2017, (12 pages in English).

Extended European search report issued on Sep. 5, 2022, in counterpart European Patent Application No. 22163602.0 (17 pages in English).

* cited by examiner

APPARATUS AND METHOD WITH GRAPHICS PROCESSING

CROSS-REFERENCE TO RELATED APPLICATIONS

This application claims the benefit under 35 USC § 119(a) of Korean Patent Application No. 10-2021-0040598 filed on Mar. 29, 2021 and Korean Patent Application No. 10-2021-0089737 filed on Jul. 8, 2021, in the Korean Intellectual Property Office, the entire disclosures of which are incorporated herein by reference for all purposes.

BACKGROUND

1. Field

The following description relates to a graphics processing apparatus and method.

2. Description of Related Art

In a graphics processing method, ray information and intersection information (or hit information) for performing ray tracing for three-dimensional (3D) rendering may have a size of approximately 48 bytes and a size of 20 bytes, respectively.

When a scene on which rendering is to be performed is complicated and a depth of a ray increases, a required memory bandwidth may increase greatly. A typical graphics processing method may not resolve an issue of a limited memory bandwidth to process ray tracing in real time, and therefore may not generate graphics of sufficient quality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus with graphics processing includes: a memory configured to store therein acceleration structure data and primitive data for performing three-dimensional (3D) rendering; and a first processor implemented in the memory and configured to receive ray information, determine a first spatial box by performing a traversal on an acceleration structure in which scene objects are spatially partitioned based on the acceleration structure data and the ray information, and determine a first intersection point for performing the 3D rendering based on the primitive data, the ray information, and the first spatial box.

The apparatus may include a second processor configured to generate the ray information comprising any one or any combination of any two or more of an origin point of a ray, a direction of the ray, an intensity of the ray, and a type of the ray.

The second processor may be configured to perform shading based on the first intersection point.

The memory may correspond to a channel among a plurality of channels and a rank among a plurality of ranks comprised in the channel.

The memory further may include: a first cache memory configured to store therein the acceleration structure data; and a second cache memory configured to store therein the primitive data.

The first spatial box may include one or more primitives.

The first processor may be configured to determine a primitive by performing an intersection test on an intersection between a ray and the first spatial box based on the ray information and the acceleration structure.

The first processor may be configured to: determine whether the first spatial box and the ray intersect with each other based on the ray information; and determine the primitive by traversing a box that intersects with the ray by traversing the acceleration structure based on a result of the determining.

The first processor may be configured to: determine whether a primitive and a ray intersect with each other based on the ray information; and determine, as the first intersection point, an intersection point between an origin point of the ray and a closest primitive based on a result of the determining.

In another general aspect, an apparatus with graphics processing includes: a first processor configured to generate ray information corresponding to a plurality of batches; a first memory configured to receive the ray information from the first processor, and determine a first intersection point based on first acceleration structure data and first primitive data for performing three-dimensional (3D) rendering and on ray information corresponding to a first batch in the received ray information; and a second memory configured to receive the ray information from the first processor, and determine a second intersection point based on second acceleration structure data and second primitive data for performing the 3D rendering and on ray information corresponding to a second batch in the received ray information.

The first memory may include a second processor configured to determine a first spatial box by performing a traversal on an acceleration structure in which scene objects are spatially partitioned based on the first acceleration structure data and the ray information, and determine the first intersection point based on the first primitive data, the ray information, and the first spatial box.

The second memory may include a third processor configured to determine a second spatial box by performing a traversal on an acceleration structure in which scene objects are spatially partitioned based on the second acceleration structure data and the ray information, and determine the second intersection point based on the second primitive data, the ray information, and the second spatial box.

The first processor may be configured to generate the ray information comprising an origin point of a ray, a direction of the ray, an intensity of the ray, and a type of the ray.

The first processor may be configured to perform shading based on the first intersection point and the second intersection point.

The first memory further may include: a first cache memory configured to store therein the first acceleration structure data; and a second cache memory configured to store therein the first primitive data.

The first spatial box may include one or more primitives.

The second processor may be configured to determine a primitive by performing an intersection test on an intersection between a ray and the first spatial box based on the ray information and the acceleration structure.

The second processor may be configured to: determine whether the first spatial box and the ray intersect with each other based on the ray information; and determine the primitive by traversing a box that intersects with the ray by traversing the acceleration structure based on a result of the determining.

The second processor may be configured to: determine whether a primitive and a ray intersect with each other based on the ray information; and determine, as the first intersection point, an intersection point between an origin point of the ray and a closest primitive based on a result of the determining.

In another general aspect, a method with graphics processing includes: storing acceleration structure data and primitive data for performing three-dimensional (3D) rendering; receiving ray information; determining a first spatial box by performing a traversal on an acceleration structure in which scene objects are spatially partitioned, based on the acceleration data structure and the ray information; and determining a first intersection point for performing the 3D rendering based on the primitive data, the ray information, and the first spatial box.

In another general aspect, an apparatus with graphics processing includes: a memory configured to store acceleration structure data and primitive data, the memory comprising a first processor configured to receive ray information from a second processor, determine a first spatial box by performing a traversal on an acceleration structure of the acceleration structure data, based on a ray of the ray information, and determine a first intersection point between the ray and a primitive of the first spatial box, based on the primitive data; and the second processor configured to perform shading based on the first intersection point.

For the performing of the traversal, the first processor may be configured to perform the traversal until a closest intersection spatial box is found.

The ray information received from the second processor may be stored in a buffer of the memory.

The first processor may be configured to determine another spatial box by reusing the acceleration structure data, based on another ray.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only and is not to be limiting of the examples. As used herein, the singular forms "a", "an", and "the" are intended to include the plural forms as well, unless the context clearly indicates otherwise. As used herein, the term "and/or" includes any one and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Figure 1:
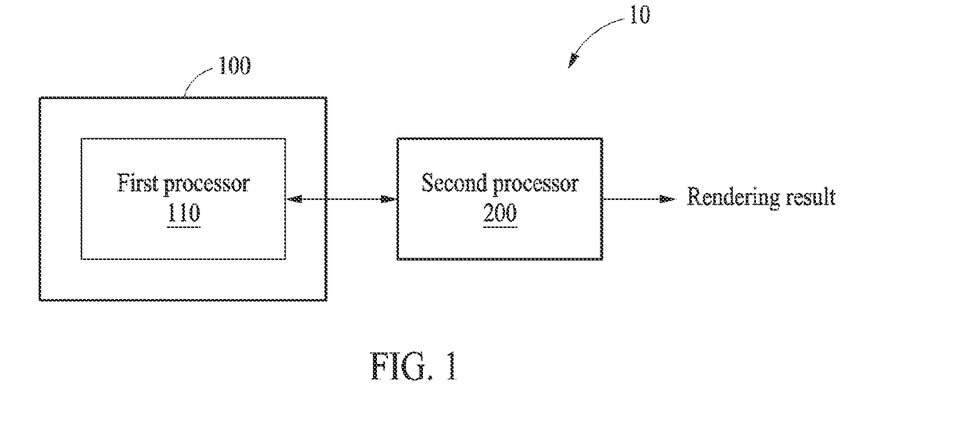
FIG. 1 illustrates an example of a graphics processing apparatus.

FIG. 1 illustrates an example of a graphics processing apparatus.

Referring to FIG. 1, a graphics processing apparatus 10 may generate a three-dimensional (3D) image through rendering. The graphics processing apparatus 10 may output a result of the rendering by performing ray tracing-based rendering. The graphics processing apparatus 10 may perform the rendering using a hardware accelerator that performs ray tracing.

Rendering may refer to a process of generating an image from a model or from a scene file corresponding to a scene including models, using a computer program. A single scene file may include entities each formed with an accurately defined language or data structure and including information associated with figure arrangement, viewpoint, texture mapping, illumination, and shading that represent a virtual scene. Data included in the scene file may be processed on a rendering program to generate a resulting product, such as, for example, a digital image and a raster graphics image. Ray tracing may refer to a method of calculating a path through which a virtual ray is reflected from a surface of an object and then returns back through a camera.

The graphics processing apparatus 10 may include a memory 100 and a second processor 200. The memory 100 may include a first processor 110.

The first processor 110 and the second processor 200 may process data stored in the memory 100. The first processor 110 and the second processor 200 may execute computer-readable code (e.g., software) stored in the memory 100 and instructions induced by the first processor 110 and the second processor 200.

The term "processor" used herein refers to a hardware data processing device having a physically structured circuit for executing desired operations. The desired operations may include, for example, code or instructions included in a program.

The hardware-implemented data processing device may include, for example, a microprocessor, a central processing unit (CPU), a processor core, a multicore processor, a multiprocessor, an application-specific integrated circuit (ASIC), and a field-programmable gate array (FPGA).

At least one of the first processor 110 or the second processor 200 may include an accelerator. The accelerator may include, for example, a graphics processing unit (GPU), a neural processing unit (NPU), a FPGA, an ASIC, and/or an application processor (AP). The accelerator may also be implemented as a computing environment such as a virtual machine.

The first processor 110 may be implemented inside the memory 100. The first processor 110 may receive ray information from the second processor 200. The second processor 200 may generate the ray information including information associated with an origin point of a ray, a direction of the ray, an intensity of the ray, and/or a type of the ray.

The first processor 110 may perform rendering based on acceleration structure data and primitive data stored in the memory 100 for performing 3D rendering and on the ray information received from the second processor 200. A primitive used herein may refer to a basic component of a graphics display, and include a point, a line, a vector, and a polygon such as a triangle, and/or a quadrangle.

An acceleration structure used herein may refer to a data structure that partitions a space (for example, a Euclidean space). The acceleration structure data that partitions a 3D space may be of a data structure that partitions a space in the form of computer-processible information for ray tracing. The acceleration structure data may include, for example, k-dimensional (k-d) tree data, octree data, binary space partitioning (BSP) tree data, and/or bounding volume hierarchy (BVH) data.

The first processor 110 may obtain (e.g., determine) a first spatial box by performing a traversal on an acceleration structure in which scene objects are spatially partitioned, based on the acceleration structure data and the ray information. The first spatial box may include one or more primitives.

The first processor 110 may obtain a primitive by performing an intersection test on an intersection between a ray and the first spatial box based on the ray information and acceleration structure. The first processor 110 may determine whether the ray and the first spatial box intersect with each other based on the ray information. Based on the presence or absence of the intersection, the first processor 110 may obtain the primitive by traversing a box that intersects with the ray by traversing the acceleration structure. The term "traverse/traversing" used herein may be construed as explore/exploring or search for/searching for.

The first processor 110 may obtain a first intersection point for performing 3D rendering based on the primitive data, the ray information, and the first spatial box. For example, the first processor 110 may determine whether the primitive and the ray intersect with each other based on the ray information. Based on the presence or absence of the intersection, the first processor 110 may obtain, as the first intersection point, an intersection point between an origin point of the ray and a closest primitive. The first intersection point may include an identification (ID) of the ray and an intersecting primitive index.

According to examples, the first processor 110 may select one mode from between an acceleration mode for performing rendering and a normal mode for processing memory access. The first processor 110 may select the one mode by using a predetermined area in a memory address as a control address for a change to the acceleration mode or the normal mode. The selecting of the mode may be described as an example of an operation, but not be construed as limiting the scope of claims.

The second processor 200 may receive the first intersection point from the first processor 110. The second processor 200 may perform shading based on the first intersection point. The shading may refer to a process of changing the illumination of a surface of an object based on a distance and an angle of light during rendering in a 3D graphics field.

The memory 100 may store data for a neural network operation. The memory 100 may store instructions that are executable by the first processor 110 and the second processor 200. The instructions may include, for example, instructions for executing operations of the first processor 110 and the second processor 200 and/or operations of components of the first processor 110 and the second processor 200.

The memory 100 may be provided as a volatile memory device or a nonvolatile memory device.

The volatile memory device may be provided as, for example, a dynamic random-access memory (RAM) (DRAM), a static RAM (SRAM), a thyristor RAM (T-RAM), a zero capacitor RAM (Z-RAM), and/or a twin-transistor RAM (TTRAM).

The nonvolatile memory device may be provided as, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, and/or an insulator resistance change memory.

The memory 100 may store the acceleration structure data and the primitive data for performing 3D rendering. The memory 100 may correspond to a channel among a plurality of channels and to a rank among a plurality of ranks included in the channel.

The memory 100 may include a first cache memory for storing the acceleration structure data and a second cache memory for storing the primitive data. The first cache memory and the second cache memory will be described in detail with reference to FIG. 3B.

Figure 2:
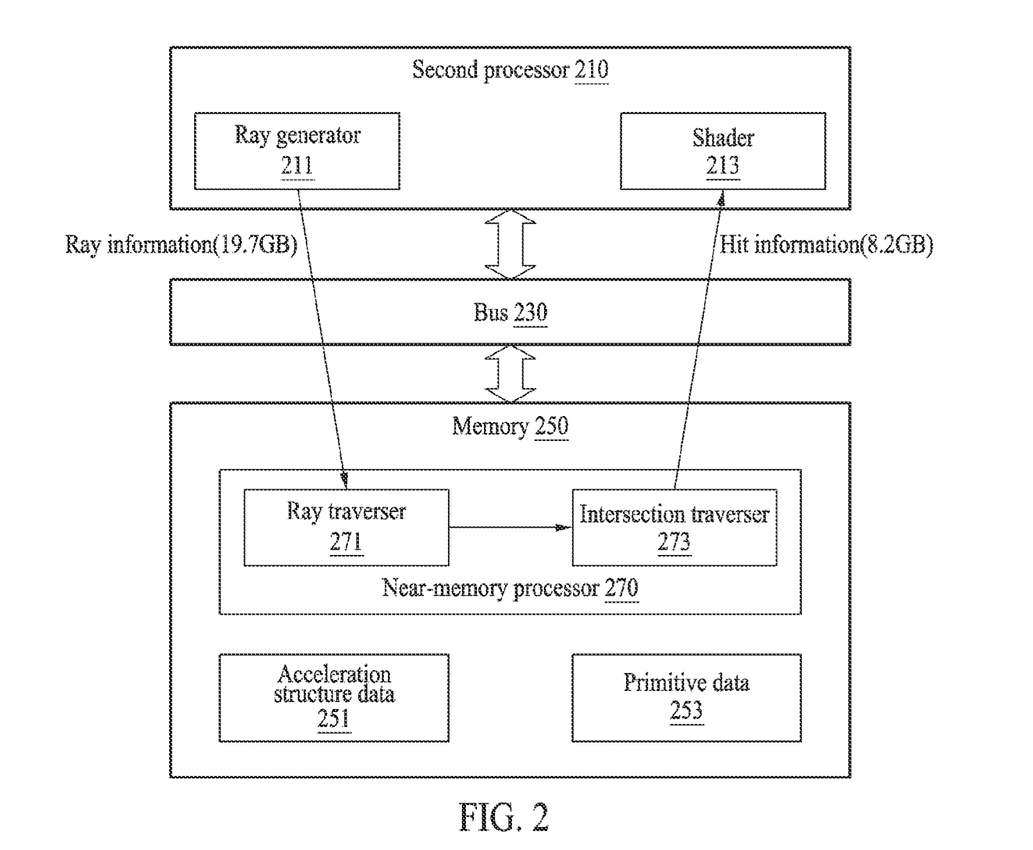
FIG. 2 illustrates an example of an operation of a graphics processing apparatus.

FIG. 2 illustrates an example of an operation of a graphics processing apparatus (e.g., the graphics processing apparatus 10 of FIG. 1).

Referring to FIG. 2, a graphics processing apparatus (for example, the graphics processing apparatus 10 of FIG. 1) may perform 3D rendering. The 3D rendering may include performing image processing that synthesizes 3D object data into an image viewed from a given camera viewpoint. The graphics processing apparatus 10 may perform the 3D rendering by performing a traversal on an acceleration structure that partitions scene objects which are a rendering target and performing a ray-primitive intersection test.

The graphics processing apparatus 10 may include a second processor 210, a bus 230, and a memory 250. The second processor 210 may include a ray generator 211 and a shader 213.

The memory 250 may include a near-memory processor 270. The near-memory processor 270 may include a ray traverser 271 and an intersection traverser 273. The memory 250 may store therein acceleration structure data 251 and primitive data 253.

The near-memory processor 270 may iteratively traverse a space-partitioning acceleration structure in the form of a tree in a process of performing an intersection test on rays generated from a camera viewpoint and secondary rays generated at an intersection point.

Operations that use a great amount of computation in terms of the performance of ray tracing may include the generation of an acceleration structure in which primitives which are a rendering target are spatially partitioned, a traversal of the acceleration structure, and a ray-primitive intersection test. For example, a ray traversal of the ray traverser 271 and an intersection traversal of the intersection traverser 273 may occupy more than 70% of operations for ray tracing and more than 90% of a memory bandwidth.

As the near-memory processor 270 is provided in the memory 250, the graphics processing apparatus 10 of one or more embodiments may effectively utilize operations and memory bandwidth used for the intersection traversal, thereby improving the performance of 3D rendering. The graphics processing apparatus 10 of one or more embodiments may reduce the memory bandwidth used for the traversal of an acceleration structure and calculation of a primitive intersection point by 7.8+0.5 terabytes (TB), compared to a typical intersection traversal method performed in separate hardware outside the memory 250. In addition, the graphics processing apparatus 10 of one or more embodiments may perform the calculation for obtaining an intersection point more rapidly through the near-memory processor 270.

The near-memory processor 270 may process the ray traversal and the intersection traversal, receive, in the form of an instruction set architecture, ray information of only a ray from which an intersection point is to be obtained, output only final intersection information (e.g., hit information, or HitInfo) to the second processor 210 through the intersection traversal processing using the acceleration structure data and the primitive data stored in the memory 250, and allow the second processor 210 to perform remaining shading and secondary ray generation.

The ray traverser 271 may perform a traversal on an acceleration structure (for example, a space-partitioning acceleration structure) and perform an intersection test on an intersection with a ray. The ray traverser 271 may perform an intersection test on an intersection between the ray and the space-partitioning acceleration structure using a ray-box test. For example, the ray traverser 271 may perform the intersection test using an axis-aligned bounding box (AABB) or an oriented bounding box (OBB).

The ray traverser 271 may determine whether the ray and a spatial box intersect with each other, and perform the traversal until a closest intersection spatial box is found while traversing the space-partitioning acceleration structure. The ray traverser 271 may use a hierarchical acceleration structure to find a closest primitive that intersects with the ray. For example, the ray traverser 271 may use a k-d tree, a BVH, or a grid as the hierarchical acceleration structure.

The intersection traverser 273 may determine whether there is an intersection with the ray from a primitive included in the spatial box selected as a result of the ray traversal of the ray traverser 271, and obtain an intersection point between an origin point of the ray and a closest primitive.

The intersection traverser 273 may determine whether the ray and the primitive intersect with each other by fetching primitive information included in the spatial box based on the output spatial box of the ray traverser 271, and calculate the intersection point.

Figure 3A:
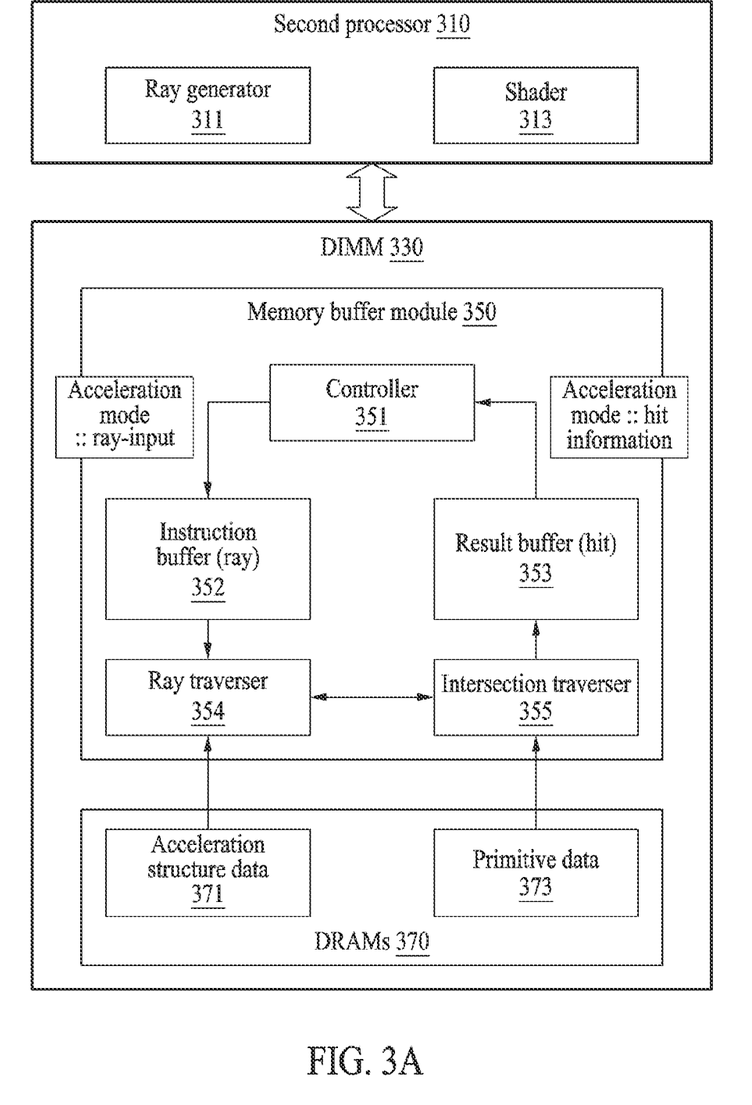
FIG. 3A illustrates an example of a configuration of a graphics processing apparatus.
Figure 3B:
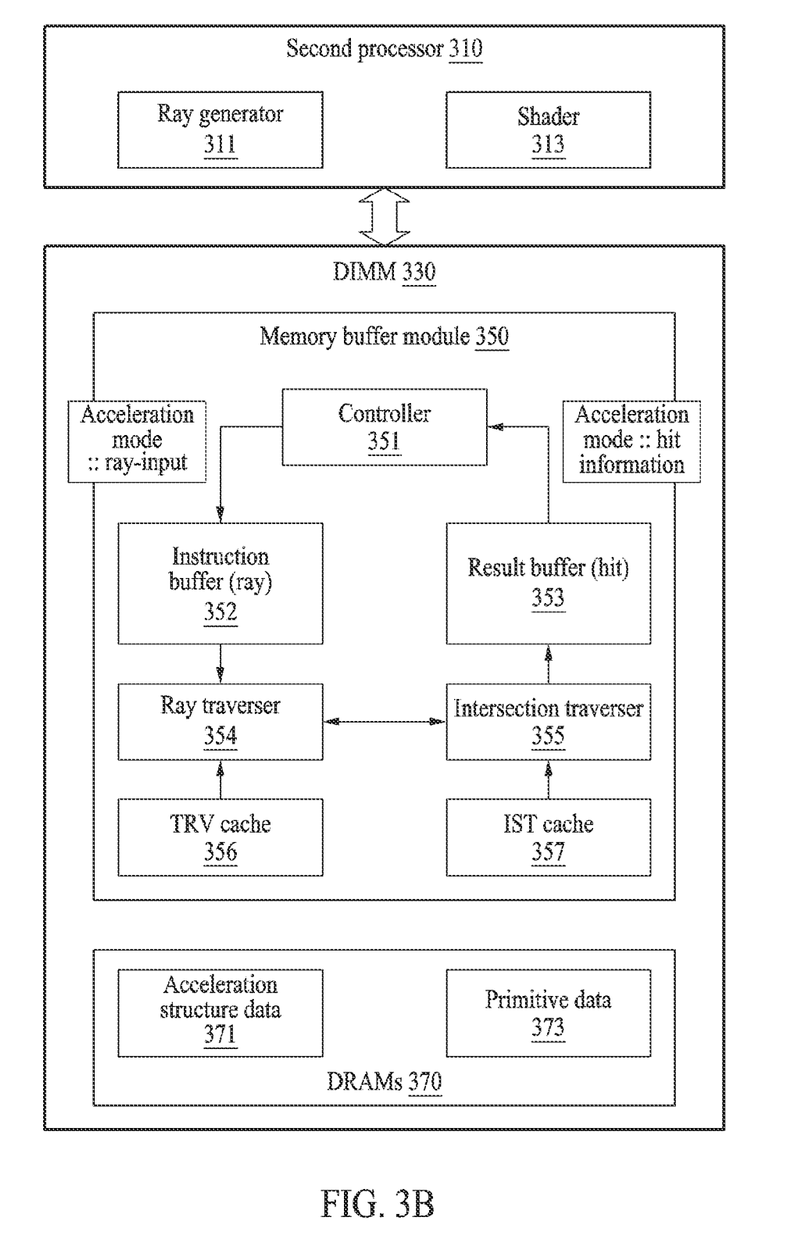
FIG. 3B illustrates an example of a configuration of a graphics processing apparatus.
Figure 3C:
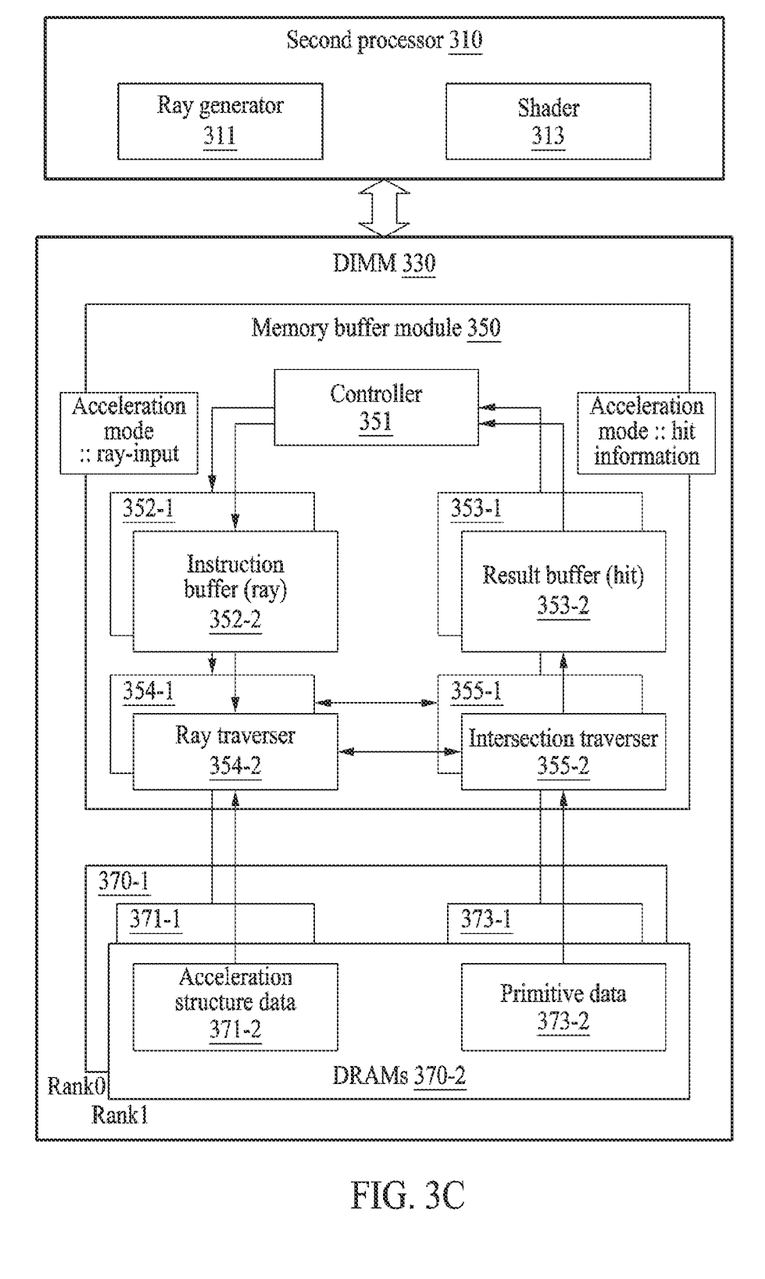
FIG. 3C illustrates an example of a configuration of a graphics processing apparatus.

FIGS. 3A through 3C illustrate examples of a configuration of a graphics processing apparatus (e.g., the graphics processing apparatus 10 of FIG. 1).

Referring to FIGS. 3A through 3C, the graphics processing apparatus 10 may include a second processor 310 (e.g., the second processor 200 of FIG. 1) and a memory 330 (e.g., the memory 100 of FIG. 1). The second processor 310 may include a ray generator 311 and a shader 313.

The memory 330 may be provided as a dual in-line memory module (DIMM). The memory 330 may include a memory buffer module 350. The memory buffer module 350 may include a controller 351, an instruction buffer 352, a result buffer 353, a ray traverser 354, and an intersection traverser 355.

The memory 330 may include a DRAM 370. The DRAM 370 may store therein acceleration structure data 371 and primitive data 373.

The ray generator 311 may generate ray information. The ray information may include information associated with an origin point of a ray, a direction of the ray, an intensity of the ray, and a type of the ray. The ray generator 311 may generate the ray or the ray information in a unit of a batch for effective control.

The ray generator 311 may output the generated ray information to the memory 330. The shader 313 may receive an intersection point from the memory 330 and perform shading.

The controller 351 may include a processor (for example, the first processor 110 of FIG. 1). According to examples, the controller 351 may process an instruction based on an operation mode of the memory 330. The operation mode described herein may be provided as an example, and not limit the scope of claims. The operation mode may include an acceleration mode and a normal mode. The acceleration mode may refer to a mode for accelerating ray tracing. The acceleration mode may be a mode for processing DIMM access for accelerating ray tracing. The acceleration mode may also be referred to as an AXDIMM mode. The normal mode may refer to a mode for processing access to the memory 330. The normal mode may be a mode for processing general DIMM instructions. The normal mode may also be referred to as a DIMM mode.

The memory 330 may use an area in an address as a control address for changing the operation mode. The area may be referred to as a DIMM mode configuration (e.g., DIMM-MODE-CONFIG). For example, when DIMM-MODE-CONFIG is an AXDIMM mode (DIMM-MODE-CONFIG=AXDIMM-MODE), the controller 351 may perform an instruction processing function for accelerating ray tracing.

The controller 351 may define a DIMM mode status (e.g., DIMM-MODE-STATUS) area in the memory 330. The controller 351 may use the DIMM mode status area to allow the second processor 310 to verify a status of the memory 330. A DIMM mode status (DIMM-MODE-STATUS) may include a current mode status and an AXDIMM status. The AXDIMM status may include a ready status, a traversal acceleration status (e.g., a busy status), a traversal end status (e.g., a done status), and an error status.

The controller 351 may control the ray traverser 354 and the intersection traverser 355. The controller 351 may obtain an intersection point from the intersection traverser 355 and output the obtained intersection point to the second processor 310.

Instructions defined to accelerate ray tracing by the controller 351 may include SET-SCENE-PARAMS, BATCH-CMD-EXE, and GET-HIT-INFO. SET-SCENE-PARAMS may include an instruction for setting information of a context to be rendered. SET-SCENE-PARAMS may include a space size, a base address in which an acceleration structure to be traversed by the ray traverser 354 is stored, and a base address in which a primitive to be used to calculate an intersection point by the intersection traverser 355 is stored. BATCH-CMD-EXE may be an instruction for starting a ray intersection traversal of a batch when a series of preparations for acceleration is completed. GET-HIT-INFO may be an instruction for outputting hit information (e.g., intersection information) which is a processing result to the second processor 310 from the result buffer 353.

The instruction buffer 352 (or a ray input buffer) may store therein a generated ray in the memory 330. The instruction buffer 352 may store therein data including ray information. For the instruction buffer 352, a separate set storage space may be allocated in the memory buffer module 350. The set storage space may be constructed as an SRAM or a register file. According to examples, the instruction buffer 352 may include, in the ray information, an instruction code (e.g., operation (OP) code and header).

The controller 351, the ray traverser 354, and the intersection traverser 355 may group together a series of rays to be processed by a unit of a batch and process each batch of grouped rays. The size of a batch may correspond to a unit of tiles of a screen to be rendered. The size of a batch may be determined based on a size available to be stored in a buffer inside the memory 330 (for example, the instruction buffer 352 or the result buffer 353).

The graphics processing apparatus 10 of one or more embodiments may store ray information and/or intersection information directly in the buffer (for example, the instruction buffer 352 or the result buffer 353), thereby saving a hardware space of the memory buffer module 350. Alternatively or additionally, the graphics processing apparatus 10 of one or more embodiments may store the ray information and/or intersection information in a rank corresponding to the memory 330 by the second processor 310 and store an offset (or index) for access in an internal storage space of the memory buffer and indirectly access it, thereby saving the hardware space of the memory buffer module 350.

Referring to FIG. 3B, the memory buffer module 350 may further include a traversal cache memory 356 (e.g., a TRV cache memory 356 as illustrated) and an intersection test cache memory 357 (e.g., an IST cache memory 357 as illustrated). Using the TRV cache memory 356, the ray traverser 354 of one or more embodiments may reduce a latency needed for access to an acceleration structure and improve a ray traversal performance when reading acceleration structure data in a ray traversal process. In addition, using the IST cache memory 357, the intersection traverser 355 of one or more embodiments may reduce a memory latency for primitive data.

The ray traverser 354 may read the acceleration structure data (e.g., BVH box data) from a memory (for example, the DRAM 370) and perform an intersection test with ray data. When a series of rays are input continuously, acceleration structure data that is used for a previous ray intersection test may be reused. When the acceleration structure data is reused, the TRV cache memory 356 of one or more embodiments may be used to save an amount of time used to read again the acceleration structure data from the memory. The ray traverser 354 of one or more embodiments may verify whether there is acceleration structure data to be read from the TRV cache memory 356, and use the data present in the TRV cache memory 356 to reduce a memory access latency and improve an overall performance.

The intersection traverser 355 may traverse intersection points by reading, from the memory (e.g., the DRAM 370), data associated with input rays and primitives included in an acceleration structure, in a similar manner as the ray traverser 354 performs. The intersection traverser 355 of one or more embodiments may also store the used data in the IST cache memory 357 to reuse the data, thereby reducing a memory latency and improving an overall performance.

Referring to FIG. 3C, the graphics processing apparatus 10 of one or more embodiments may improve an acceleration efficiency of ray tracing through rank-level parallelization. A ray traversal and intersection traversal process may be independently performed for each batch, and thus the memory 330 may perform, in parallel, an intersection traversal based on a batch unit of ray information received as an input from the second processor 310, using a plurality of instruction buffers 352-1 and 352-2, a plurality of result buffers 353-1 and 353-2, a plurality of ray traversers 354-1 and 354-2, a plurality of intersection traversers 355-1 and 355-2, and a plurality of DRAMs 370-1 and 370-2 that respectively correspond to rank 0 and rank 1.

The graphics processing apparatus 10 may process ray information input to each of the instructions buffers 352-1 and 352-2 using the ray traversers 354-1 and 354-2 and the intersection traversers 355-1 and 355-2 that respectively correspond to rank 0 and rank 1, and store results of the processing in the result buffers 353-1 and 353-2, respectively. Through this rank-level parallelization, the graphics processing apparatus 10 of one or more embodiments may thereby improve a ray intersection traversal performance.

The second processor 310 may set a rank ID in an instruction set, and perform the parallelization. The DRAMs 370-1 and 370-2 may store and set the same acceleration structure data and primitive data sets such that a plurality of sets 371-1 and 371-2 of acceleration structure data and a plurality of sets 373-1 and 373-2 of primitive data operate independently in the respective ranks. The graphics processing apparatus 10 of one or more embodiments may perform the rank-level parallelization to increase a graphic processing performance by a factor of two times, for example.

Figure 4:
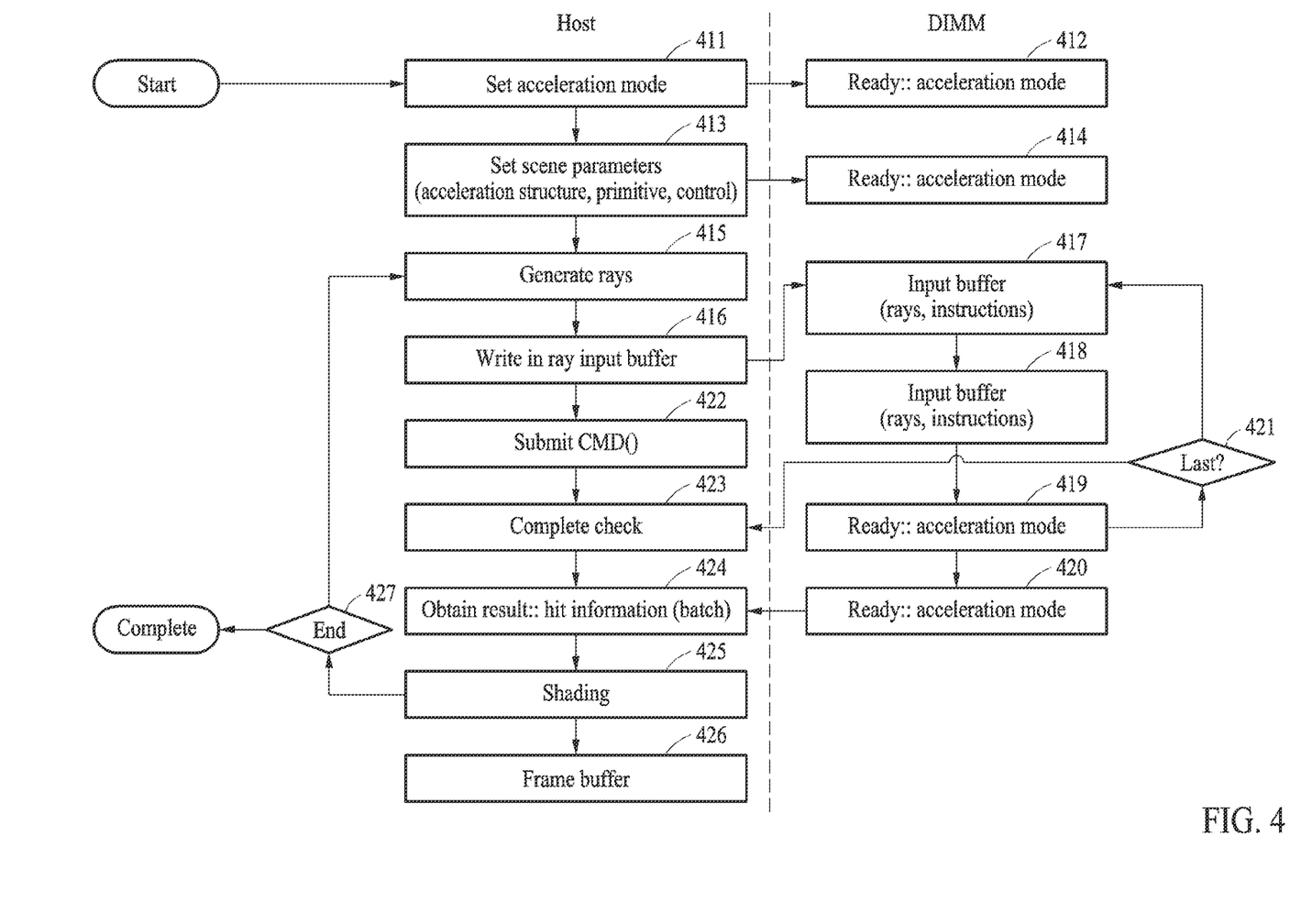
FIG. 4 illustrates an example of ray tracing of a graphics processing apparatus.

FIG. 4 illustrates an example of ray tracing of a graphics processing apparatus (e.g., the graphics processing apparatus 10 of FIG. 1).

The graphics processing apparatus 10 may perform 3D rendering through ray tracing using a host (e.g., the second processor 200 of FIG. 1) and a DIMM (e.g., the memory 100 of FIG. 1).

Referring to FIG. 4, in operation 411, the host may set an acceleration mode. When the acceleration mode is physically available to be simultaneously performed, the setting for a mode change may be skipped or omitted. For a detailed description of an example of the acceleration mode, reference may be made to what is described above. In operation 412, the DIMM may be set to be a ready state for the acceleration mode in response to the acceleration mode being set.

In operation 413, the host may set scene parameters. For example, the host may set acceleration structure, primitive, and control parameters. In operation 414, the DIMM may set the scene parameters in response to the scene parameters being set.

In operation 415, the host may generate rays or ray information. In operation 416, the host may perform write in a ray input buffer (for example, the instruction buffer 352 of FIG. 3A). In operation 417, the DIMM may store the rays and instructions in the input buffer in response to the write in the ray input buffer. In operation 418, the DIMM may perform a ray traversal and return an index of a spatial box. In operation 419, the DIMM may perform an intersection traversal and return hit information (e.g., intersection information). In operation 420, the DIMM may write the hit information in a result buffer. In such a case, when it is not a last intersection traversal, the DIMM may repeat operations 417 through 419.

In operation 422, the host may submit an instruction. In operation 423, when the DIMM traverses the last intersection point, the host may complete a check. In operation 424, the host may obtain the hit information for each batch unit. In operation 425, the host may perform shading based on the obtained hit information. In operation 426, the host may store a result of the shading in a frame buffer.

In operation 427, when the shading is completed, the host may terminate operations. However, when the shading is not completed, the host may perform again operation 415.

Figure 5:
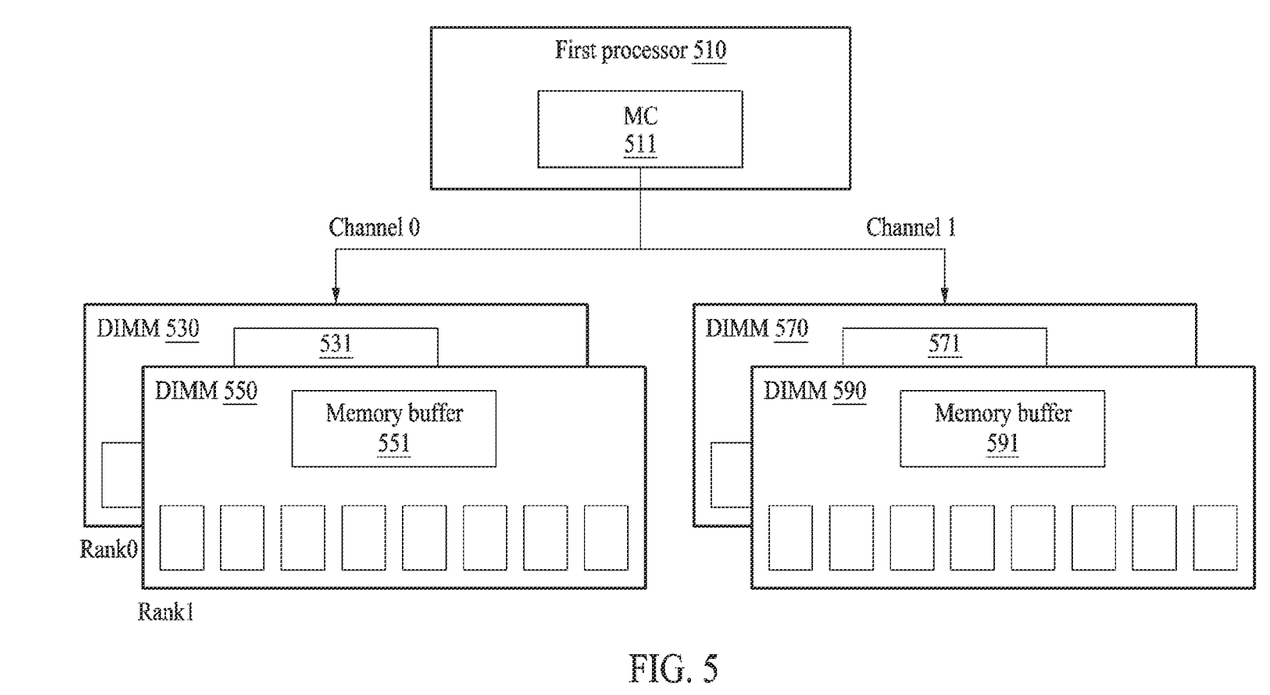
FIG. 5 illustrates an example of a graphics processing apparatus.
Figure 6:
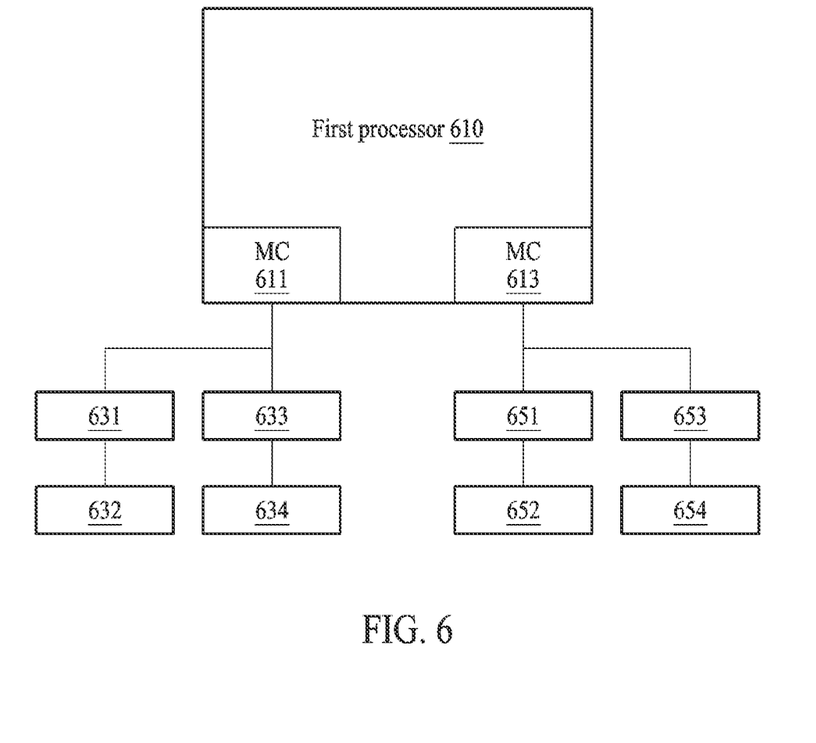
FIG. 6 illustrates an example of a graphics processing apparatus.

FIG. 5 illustrates an example of a graphics processing apparatus. FIG. 6 illustrates an example of a graphics processing apparatus.

Referring to FIGS. 5 and 6, a graphics processing apparatus may include a first processor 510 and a plurality of memories 530, 550, 570, and 590. The first processor 510 (e.g., the second processor 200 of FIG. 1) may include a memory controller 511 (or MC 511 as illustrated). The memory 530 may include a memory buffer 531, the memory 550 may include a memory buffer 551, the memory 570 may include a memory buffer 571, and the memory 590 may include a memory buffer 591.

The memory controller 511 may control a DRAM chip through the memory buffers 531, 551, 571, and 591, and access data. The memory controller 511 may be provided as two or more memory controllers in the first processor 510, and one memory controller may hierarchically correspond to a plurality of channels each including a plurality of ranks. In the example of FIG. 5, there are one memory controller 511 and two ranks illustrated for the convenience of description. However, the number of memory controllers and the number of channels and ranks are not limited to the foregoing example.

The memories 530, 550, 570, and 590 may use the memory buffers 531, 551, 571, and 591 as an interface for performing an instruction from the memory controller 511. All operations for control and data access may be performed through the memory buffers 531, 551, 571, and 591. The memory controller 511 may access all sets of data of DRAM chips in the memories 530, 550, 570, and 590, and perform a control operation on each rank as a unit.

Each of the memories 530, 550, 570, and 590 may include a processor. For example, the memory 530 may include a second processor, and the memory 550 may include a third processor.

The first processor 510 may generate ray information corresponding to a plurality of batches. The first processor 510 may generate the ray information including information associated with an origin point of a ray, a direction of the ray, an intensity of the ray, and a type of the ray.

The first processor 510 may generate one batch by grouping together a plurality of rays into one batch. The size of a batch may correspond to a unit of tiles of a screen to be rendered. The first processor 510 may determine the size of one batch based on the size available to store in the memory buffers 531, 551, 571, and 591 in the memories 530, 550, 570, and 590.

A first memory (for example, the memory 530) may receive the ray information from the first processor 510, and obtain a first intersection point based on first acceleration structure data and first primitive data for performing 3D rendering and on ray information corresponding to a first batch in the received ray information.

A second memory (for example, the memory 550) may receive the ray information from the first processor 510, and obtain a second intersection point based on second acceleration structure data and second primitive data for performing 3D rendering and on ray information corresponding to a second batch in the received ray information.

The first memory may include a second processor. The second processor may obtain a first spatial box by performing a traversal on an acceleration structure in which scene objects are spatially partitioned, based on the first acceleration structure data and the ray information. The second processor may obtain the first intersection point based on the first primitive data, the ray information, and the first spatial box. The first spatial box may include one or more primitives.

The second memory may include a third processor. The third processor may obtain a second spatial box by performing a traversal on the acceleration structure in which scene objects are spatially partitioned, based on the second acceleration structure data and the ray information. The third processor may obtain the second intersection point based on the second primitive data, the ray information, and the second spatial box.

The first memory may further include a first cache memory for storing the first acceleration structure data and a second cache memory for storing the first primitive data.

The second processor may obtain a primitive by performing an intersection test on an intersection between a ray and the first spatial box based on the ray information and the acceleration structure. The second processor may obtain the primitive by determining whether the ray and the first spatial box intersect with each other and traversing a box intersecting with the ray while traversing the acceleration structure based on the presence or absence of the intersection.

The second processor may determine whether the primitive and the ray intersect with each other based on the ray information, and obtain, as the first intersection point, an intersection point between an origin point of the ray and a closest primitive.

The second processor may select one mode from between an acceleration mode for performing rendering and a normal mode for processing memory access.

The second processor may select the one mode by using a predetermined area in an address of the first memory as a control address for a change to the acceleration mode or the normal mode.

The second processor may output the obtained first intersection point to the first processor 510, and the third processor may output the obtained second intersection point to the first processor 510. Operations of the third processor may be the same as operations of the second processor, in an example.

The first processor 510 may perform shading based on the first intersection point and the second intersection point.

In addition, distributing a ray input for rank-level parallelization in DIMMs for each DIMM may enable parallelization of a multiple instruction, multiple data (MIMD) type that is independently performed.

Referring to FIG. 6, a first processor 610 may include a plurality of memory controllers (or MCs as illustrated) 611 and 613. The graphics processing apparatus 10 may include a plurality of memories 631 through 634 and 651 through 654 that may operate in a ray tracing acceleration mode, and accelerate ray tracing proportionally to the number of memories.

In the example of FIG. 6, two AXDIMMs may be provided for every two channels in the two memory controllers 611 and 613 and a ray arrangement may be input to each memory from the first processor 610, and thus ray tracing may be accelerated in up to six memories. In addition, by applying rank-level parallelization described above, the graphics processing apparatus 10 of one or more embodiments may perform an intersection traversal for ray tracing at a speed that is fast by a factor of maximally 12 times, for example. An available memory topology may vary based on the first processor 610 and a board configuration. In such various topologies, scalable AXDIMM-RT acceleration may be performed.

For the acceleration of ray tracing, the first processor 610 may generate an instruction by dividing memory acceleration units mapped to a system memory for the application of ray tracing, and input the generated instruction for an operation.

The graphics processing apparatus 10 of one or more embodiments may process, in a memory buffer, a ray traversal and an intersection traversal that use a great memory bandwidth in a process of ray tracing, and may thus effectively perform the ray traversal and the intersection traversal.

The first processor 610 of one or more embodiments may distribute an input such that the memories 631 through 634 and 651 through 654 performs rank-based parallel ray tracing, thereby improving the speed of ray tracing.

Figure 7:
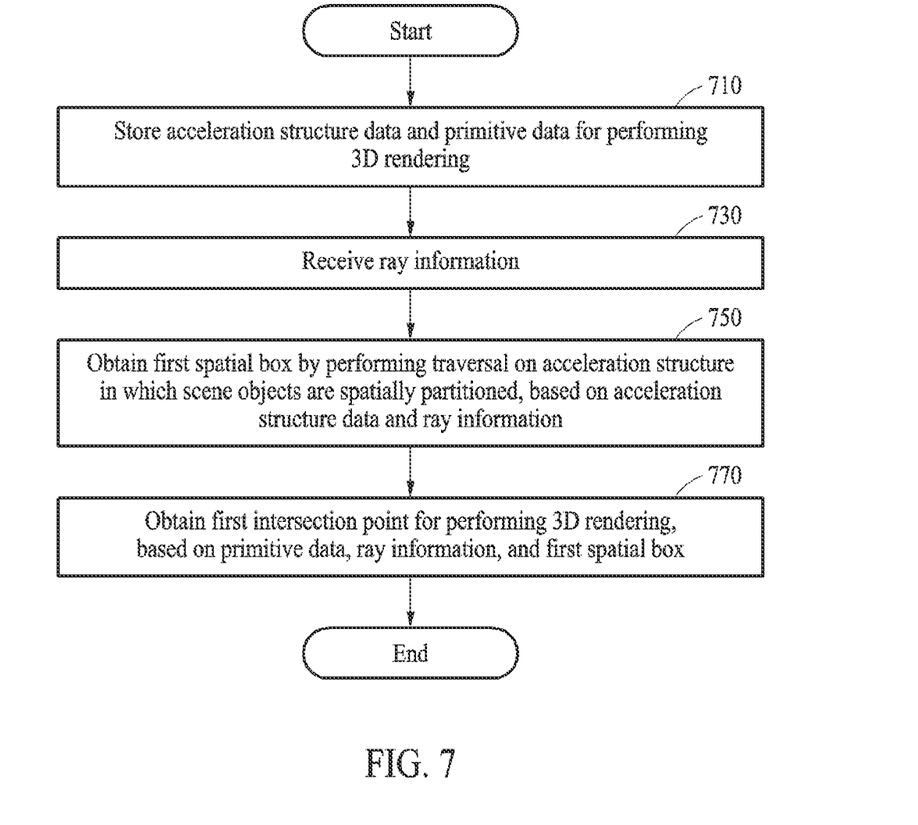
FIG. 7 illustrates an example of a graphics processing method of a graphics processing apparatus.

FIG. 7 illustrates an example of a graphics processing method of a graphics processing apparatus (e.g., the graphics processing apparatus 10 of FIG. 1).

Referring to FIG. 7, in operation 710, a memory (for example, the memory 100 of FIG. 1) may store acceleration structure data and primitive data for performing 3D rendering. For example, the memory 100 may include a first cache memory for storing the acceleration structure data and a second cache memory for storing the primitive data.

A first processor (for example, the first processor 110 of FIG. 1) may be implemented inside the memory 100. In operation 730, the first processor 110 may receive ray information from a second processor (for example, the second processor 200 of FIG. 1). The second processor 200 may generate the ray information including an origin point of a ray, a direction of the ray, an intensity of the ray, and a type of the ray.

In operation 750, the first processor 110 may obtain a first spatial box by performing a traversal on an acceleration structure in which scene objects are spatially partitioned based on the acceleration structure data and the ray information. The first spatial box may include one or more primitives.

The first processor 110 may obtain a primitive by performing an intersection test on an intersection between the ray and the first spatial box based on the ray information and the acceleration structure. The first processor 110 may determine whether the ray and the first spatial box intersect with each other based on the ray information. The first processor 110 may obtain the primitive by traversing a box intersecting with the ray while traversing the acceleration structure based on the presence or absence of the intersection.

In operation 770, the first processor 110 may obtain a first intersection point for performing 3D rendering based on the primitive data, the ray information, and the first spatial box. The first processor 110 may determine whether the primitive and the ray intersect with each other based on the ray information. The first processor 110 may obtain, as the first intersection point, an intersection point between the origin point of the ray and a closest primitive based on the presence or absence of the intersection.

The first processor 110 may select one mode from between an acceleration mode for performing rendering and a normal model for processing memory access. The first processor 110 may select the one mode by using a predetermined area in a memory address as a control address for a change to the acceleration mode or the normal mode.

The second processor 200 may receive the first intersection point from the first processor 110. The second processor 200 may perform shading based on the first intersection point.

The graphics processing apparatuses, memories, first processors, second processors, buses, ray generators, shaders, near-memory processors, ray traversers, intersection traversers, controllers, instruction buffers, result buffers, DRAMs, traversal cache memories, intersection test cache memories, memory controllers, memory buffers, graphics processing apparatus 10, memory 100, first processor 110, second processor 200, second processor 210, bus 230, memory 250, ray generator 211, shader 213, near-memory processor 270, ray traverser 271, intersection traverser 273, second processor 310, ray generator 311, shader 313, memory 330, controller 351, instruction buffer 352, result buffer 353, ray traverser 354, intersection traverser 355, DRAM 370, traversal cache memory 356, intersection test cache memory 357, instruction buffers 352-1 and 352-2, result buffers 353-1 and 353-2, ray traversers 354-1 and 354-2, intersection traversers 355-1 and 355-2, DRAMs 370-1 and 370-2, first processor 510, memories 530, 550, 570, and 590, memory controller 511, memory buffers 531, 551, 571, and 591, first processor 610, memory controllers 611 and 613, memories 631 through 634 and 651 through 654, and other devices, apparatuses, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An apparatus with graphics processing, comprising:
  a memory device, the memory device comprising:
    a first processor configured to determine spatial boxes by performing a traversal on an acceleration structure in which scene objects are spatially partitioned based on acceleration structure data and ray information received from a second processor, and to determine intersection points based on primitive data, the ray information, and the spatial boxes;
    a first memory configured to receive the ray information from the second processor, and determine, via the first processor, a first intersection point based on first acceleration structure data of the acceleration structure data and first primitive data of the primitive data for performing three-dimensional (3D) rendering and on ray information corresponding to a first batch in the received ray information; and
    a second memory configured to receive the ray information from the second processor, and determine a second intersection point based on second acceleration structure data of the acceleration structure data and second primitive data of the primitive data for performing the 3D rendering and on ray information corresponding to a second batch in the received ray information; and
  the second processor configured to generate the ray information corresponding to a plurality of batches,
  wherein the second processor is located outside of the memory device, and
  wherein a size of each of the plurality of batches is determined based on either one or both of a tile of a screen to be rendered and a buffer of corresponding memory.

2. The apparatus of claim 1, wherein the first processor determines a first spatial box of the spatial boxes, and
  wherein the second memory comprises:
    a third processor configured to determine a second spatial box of the spatial boxes by performing a traversal on an acceleration structure in which scene objects are spatially partitioned based on the second acceleration structure data and the ray information, and determine the second intersection point based on the second primitive data, the ray information, and the second spatial box.

3. The apparatus of claim 1, wherein the second processor is further configured to:
  generate the ray information comprising an origin point of a ray, a direction of the ray, an intensity of the ray, and a type of the ray.

4. The apparatus of claim 1, wherein the second processor is further configured to:
  perform shading based on the first intersection point and the second intersection point.

5. The apparatus of claim 1, wherein the first memory further comprises:
  a first cache memory configured to store therein the first acceleration structure data; and
  a second cache memory configured to store therein the first primitive data.

6. The apparatus of claim 1, wherein the spatial boxes comprise one or more primitives.

7. The apparatus of claim 1, wherein the first processor is further configured to:
  determine a primitive by performing an intersection test on an intersection between a ray and a respective spatial box based on the ray information and the acceleration structure.

8. The apparatus of claim 7, wherein the first processor is further configured to:
  determine whether the respective spatial box and the ray intersect with each other based on the ray information; and
  determine the primitive by traversing a box that intersects with the ray by traversing the acceleration structure based on a result of the determining.

9. The apparatus of claim 1, wherein the first processor is further configured to:
  determine whether a primitive and a ray intersect with each other based on the ray information; and
  determine, as the first intersection point, an intersection point between an origin point of the ray and a closest primitive based on a result of the determining.

10. A method with graphics processing, the method comprising:
  determining, by a first processor comprised in a memory device, spatial boxes by performing a traversal on an acceleration structure in which scene objects are spatially partitioned based on acceleration structure data and ray information;
  determining, by the first processor, intersection points based on primitive data, the ray information, and the spatial boxes;
  receiving, by a first memory of the memory device, the ray information from a second processor, and determining, by first processor and within the first memory, a first intersection point based on first acceleration structure data of the acceleration structure data and first primitive data of the primitive data for performing three-dimensional (3D) rendering and on first ray information corresponding to a first batch in the received ray information; and
  receiving, by a second memory of the memory device, the ray information from the second processor, and determining, by a third processor within the second memory, a second intersection point based on second acceleration structure data of the acceleration structure data and second primitive data of the primitive data for performing the 3D rendering and on second ray information corresponding to a second batch in the received ray information; and generating, by a second processor, the ray information corresponding to a plurality of batches, wherein the second processor is located outside of the memory device, and wherein a size of each of the plurality of batches is determined based on either one or both of a tile of a screen to be rendered and a buffer of corresponding memory.

11. The method of claim 10, further comprising:

determining, by the first processor, a first spatial box of the spatial boxes; and determining, by the third processor comprised in the second memory, a second spatial box of the spatial boxes by performing a traversal on an acceleration structure in which scene objects are spatially partitioned based on the second acceleration structure data and the ray information, and determining, by the third processor, the second intersection point based on the second primitive data, the ray information, and the second spatial box.

12. The method of claim 11, further comprising:

determining, by the first processor, a primitive by performing an intersection test on an intersection between a ray and the first spatial box based on the ray information and the acceleration structure.

13. The method of claim 12, further comprising:

determining, by the first processor, whether the first spatial box and the ray intersect with each other based on the ray information; and determining, by the first processor, the primitive by traversing a box that intersects with the ray by traversing the acceleration structure based on a result of the determining.

14. The method of claim 10, further comprising:

generating, by the second processor, the ray information comprising an origin point of a ray, a direction of the ray, an intensity of the ray, and a type of the ray.

15. The method of claim 10, further comprising:

performing, by the second processor, shading based on the first intersection point and the second intersection point.

16. The method of claim 10, further comprising:

storing, by a first cache memory comprised in the first memory, the first acceleration structure data; and storing, by a second cache memory comprised in the first memory, the first primitive data.

17. The method of claim 10, wherein the spatial boxes comprise one or more primitives.

18. The method of claim 10, further comprising:

determining, by the first processor, whether a primitive and a ray intersect with each other based on the ray information; and determining, by the first processor, as the first intersection point, an intersection point between an origin point of the ray and a closest primitive based on a result of the determining.

19. An apparatus with graphics processing, comprising:

a first processor;

a second processor configured to generate ray information corresponding to a plurality of batches; and a memory device, the memory device comprising:

the first processor configured to determine spatial boxes by performing a traversal on an acceleration structure in which scene objects are spatially partitioned based on acceleration structure data and ray information received from a second processor, and to determine intersection points based on primitive data, the ray information, and the spatial boxes; and a first memory configured to receive the ray information from the second processor, and determine the intersection points via the first processor based on the acceleration structure data and the primitive data for performing three-dimensional (3D) rendering and on ray information respectively corresponding to the plurality of batches in the received ray information, wherein the second processor is located outside of the memory device, and wherein a size of each of the plurality of batches is determined based on either one or both of a tile of a screen to be rendered and a buffer of corresponding memory.

20. The apparatus of claim 19, wherein the memory device further comprises:

a second memory configured to store acceleration structure data and primitive data.

21. The apparatus of claim 20, wherein the first processor is further configured to read the acceleration structure data from the second memory to perform an intersection test.

22. The apparatus of claim 20, wherein the first processor is further configured to read the primitive data and the acceleration structure data from the second memory to further perform intersection section traversal.

23. The apparatus of claim 19, wherein the first processor is further configured to output final intersection information to the second processor.

* * * * *